Sept. 2, 1941.  K. SCHÄFER  2,254,497
SELF-SUPPORTING VEHICLE BODY FRAME OR CHASSIS
FRAME, PARTICULARLY FOR AUTOMOBILES
Filed July 11, 1939
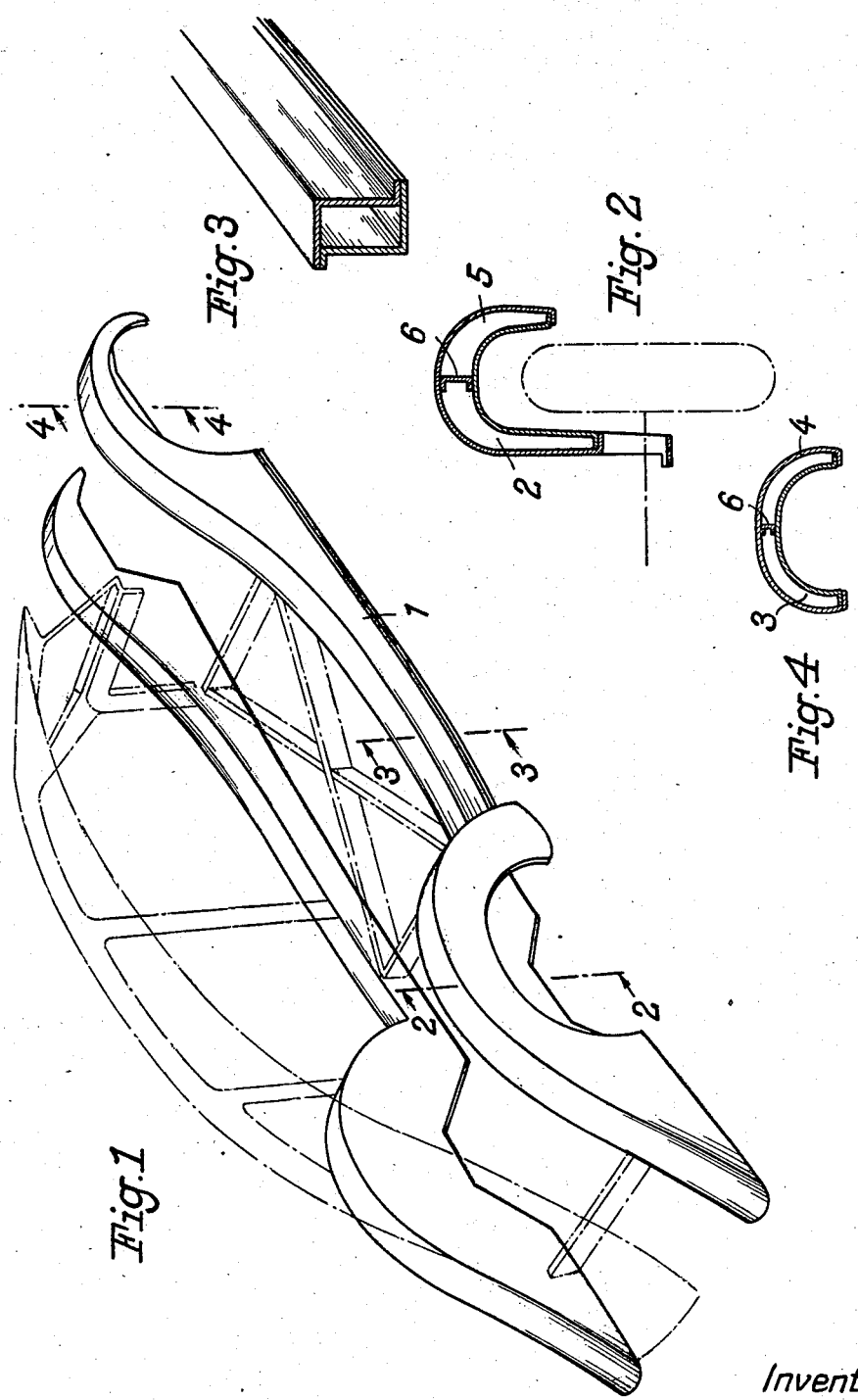
Inventor:
KURT SCHÄFER
By John P. Tarbox
Attorney Patented Sept. 2, 1941

2,254,497

UNITED STATES PATENT OFFICE 2,254,497

SELF-SUPPORTING VEHICLE BODY FRAME OR CHASSIS FRAME, PARTICULARLY FOR AUTOMOBILES

Kurt Schäfer, Berlin-Eichkamp, Germany, assignor to Edward G. Budd Manufacturing Company, Philadelphia, Pa., a corporation of Pennsylvania Application July 11, 1939, Serial No. 283,726
In Germany July 16, 1938

7 Claims. (Cl. 280—106)

The present invention relates to a self-supporting vehicle body frame or chassis frame particularly for automobiles. The longitudinal bearers or sills of the chassis frame or of the underframe of the body, which serves simultaneously as the chassis frame, must in some instances extend at the front and rear in such a manner as to avoid the wheels. Generally this is achieved by arranging the sills between the wheels. In such a construction, the sills will take up a comparatively large space and consequently reduce the width available for body space or motor space. In order to avoid this there has already been a proposal that the longitudinal bearers or sills should be formed to pass directly over the wheels. This arrangement, however, is of little practical value, as the bearers or sills, due to the necessity of curving them over the wheels, suffer a loss in strength and rigidity and furthermore, particularly over the rear wheels, take up the space normally required for the arm rests of the rear seats.

These disadvantages are avoided by the construction of the present invention, according to which the inner wall of the wheel housings or the wheel housings themselves are formed as box-section extensions of the longitudinal side bearers or sills. Due to the fact that the height available for the formation of these box-section members is approximately equal to one half the diameter of the wheel housing, it will be possible to make them very narrow without loss of rigidity and stiffness. These box-section members in the region above the wheel housings may be turned outwardly or be similarly formed, so that the upper part of the wheel housing is also wholly or partly of box-section.

The fender will be secured in the usual manner to the outside of the upper edge of this box forming the wheel housing. In order further to increase the stiffness the fender itself may be formed of box-section. The outer and inner walls of the wheel housing and/or the fender may be formed in one piece or of several pieces suitably welded together.

Reinforcements may usefully be provided between the inner and outer walls of the box-section members, particularly at the highest points thereof. Finally the walls of the longitudinal bearers or sills, and the walls of the wheel housings and/or the fender may be in one piece.

The invention is illustrated by way of example in the accompanying drawing, of which Figure 1 is a diagrammatic representation of a vehicle body frame or chassis frame; and Figures 2, 3 and 4 are sections on the lines 2—2, 3—3, 4—4 respectively of Figure 1.

The longitudinal box-section bearers or sills 1, which in known manner may be formed of box-section which are extended at the front or at the rear or at both, forming in the region of the front wheels the box-section bearer 3 and in the region of the rear wheels the box section bearer 2. According to the modification of the invention illustrated in the drawing, these box-section members extend up over the wheel to about the longitudinal centre plane thereof. The fenders 4 and 5 are also formed of box-section and are secured to the box-section wheel housing at said longitudinal centre plane.

It will be clear from the drawing that the bearers 2 and 3 take up very little space and follow closely the form of the wheels. Space is gained in the transverse width and the use of the space above the wheel for the bearer is avoided quite apart from the fact that such a bearer bent up over the wheel would not possess the required rigidity. The box-section members may, if desired, be reinforced by the members 6.

The material employed may be sheet metal, synthetic resin materials or other similar material.

I claim:

1. A vehicle with a box-section longitudinal side frame member and a wheel housing, in which the side and the upper walls of the said wheel housing form a box-section extension of the said side member.

2. A vehicle with box-section longitudinal side frame members, wheel housings and fenders, in which the side and the upper walls of the said wheel housings and fenders form box section extensions of the said side frame members.

3. A vehicle with box-section longitudinal side frame members and wheel housings in which the side and the upper walls of each said wheel housing form a box section extension of the said side frame members, at least one of the walls of one of the said side frame members and of the appertaining extension being formed of one piece.

4. A vehicle having box-section longitudinal side frame members, wheel housings and fenders in which the side and the upper walls of each said wheel housing and fender form a box-section extension of said side frame member, the inner and outer walls of said extension being formed each of one piece.

5. A vehicle having box-section longitudinal side frame members, wheel housings and fenders, in which each said wheel housing and fender forms a box-section extension of the side frame member, the walls of said side frame member each being formed in one piece with corresponding walls of the wheel housing and fender.

6. A vehicle having a box-section longitudinal side frame member and a wheel housing in which the said wheel housing forms a box-section extension of said side frame member, reinforcement being secured between and interbracing opposing walls of said extension.

7. A vehicle having a longitudinal side frame member, a wheel housing and a fender, all three being box shaped in cross section, the said wheel housing and fender forming an extension of the side frame member, a reinforcement being inserted between opposing walls of the said extension.

KURT SCHÄFER.